(12) United States Patent
Akerberg et al.

(10) Patent No.: US 10,464,748 B2
(45) Date of Patent: Nov. 5, 2019

(54) DEVICE FOR PREVENTING SMALL ITEMS FROM FALLING BETWEEN SEVERAL OBJECTS

(71) Applicant: The Crumb Catcher, LLC, Des Moines, IA (US)

(72) Inventors: Clinton E. Akerberg, Des Moines, IA (US); Kate R. Lyon, Des Moines, IA (US)

(73) Assignee: The Crumb Catcher, LLC, Des Moines, IA (US)

( * ) Notice: Subject to any disclaimer, the term of this patent is extended or adjusted under 35 U.S.C. 154(b) by 0 days.

(21) Appl. No.: 16/108,515

(22) Filed: Aug. 22, 2018

(65) Prior Publication Data

US 2019/0218028 A1    Jul. 18, 2019

Related U.S. Application Data

(60) Provisional application No. 62/616,938, filed on Jan. 12, 2018.

(51) Int. Cl.
| | | |
|---|---|---|
| *A47B 23/00* | (2006.01) | |
| *B65F 1/14* | (2006.01) | |
| *B29C 48/07* | (2019.01) | |
| *B29C 48/00* | (2019.01) | |

(52) U.S. Cl.
CPC .......... *B65F 1/1426* (2013.01); *B65F 1/1415* (2013.01); *B29C 48/0022* (2019.02); *B29C 48/07* (2019.02); *B65F 2210/136* (2013.01); *B65F 2250/114* (2013.01)

(58) Field of Classification Search
CPC ...... A47B 95/002; D06F 39/12; E04F 19/045; E04F 19/0495
See application file for complete search history.

(56) References Cited

U.S. PATENT DOCUMENTS

| | | | | |
|---|---|---|---|---|
| 4,948,195 A * | 8/1990 | Saunders | ................. | B60N 2/91 297/182 |
| 5,518,309 A * | 5/1996 | St-Pierre | ................. | D06F 39/12 211/86.01 |
| 5,934,098 A * | 8/1999 | Lee | ................. | F25D 23/087 312/401 |
| 2003/0111942 A1* | 6/2003 | Judge | ................. | H05K 7/1421 312/334.46 |
| 2004/0129183 A1* | 7/2004 | Owen | ................. | A47B 97/00 108/27 |
| 2009/0199390 A1* | 8/2009 | Dobelle | ............... | A47B 95/043 29/522.1 |
| 2015/0211240 A1* | 7/2015 | Coca | ................. | A47B 95/002 52/468 |

* cited by examiner

*Primary Examiner* — Matthew W Ing
(74) *Attorney, Agent, or Firm* — McKee, Voorhees & Sease, PLC

(57) ABSTRACT

An angled plastic device is placed between two stationary objects to prevent small items from reaching the floor. The device does not cover the gap but allows the small objects and debris to fall directly into a trap. This allows for easy cleaning. The device also results in a more aesthetically appealing environment, as the device is not visible on the smooth services of the appliances or stationary objects surrounding the device.

17 Claims, 4 Drawing Sheets

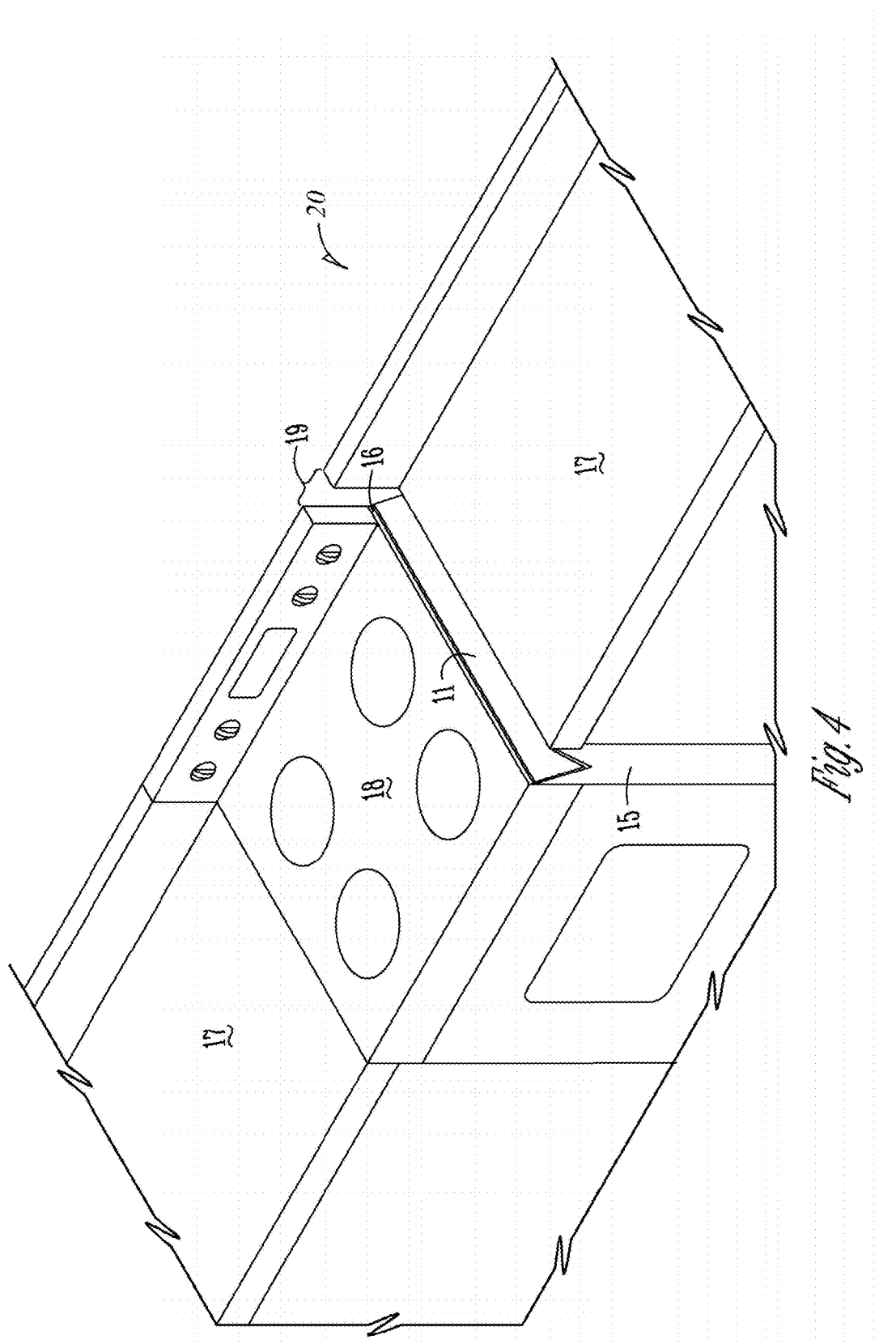

DEVICE FOR PREVENTING SMALL ITEMS FROM FALLING BETWEEN SEVERAL OBJECTS

CROSS REFERENCE TO RELATED APPLICATIONS

This application claims priority under 35 U.S.C. § 119 to provisional application U.S. Ser. No. 62/616,938, filed Jan. 12, 2018. The provisional patent application is herein incorporated by reference in its entirety, including without limitation, the specification, claims, and abstract, as well as any figures, tables, appendices, or drawings thereof.

FIELD OF THE INVENTION

The present disclosure relates generally to a device for preventing small items from falling between several objects. More particularly, the present disclosure relates to a device which catches food, dust, other debris, articles of clothing, and other debris from entering the gap between two stationary objects, such as a stove and a countertop or a washer and a dryer.

BACKGROUND OF THE INVENTION

Most kitchens have a free-standing stove/oven recessed between countertop space, which results in a gap between the stove and the countertop. With this gap, debris and crumbs fall to the floor. Since the gap between the stove and countertop is small, one cannot easily clean the floor to remove the fallen debris, requiring the stove to be moved for cleaning. This gap results in a messy, unclean floor in one's kitchen causing much angst.

Products currently on the market attempt to solve the issues of falling debris and dirty floors by placing a large stove gap filler on top of the gap. A stove gap filler is a consumer product shaped like a speed bump covering the gap from the top, with a notch on the bottom that fits into the gap to hold the product in place. The bump is used to prevent crumbs from falling onto the floor. The stove gap filler results in an unsightly look in kitchens and allows debris to build up on either side of the bump. The stove gap filler simply transfers the mess from the floor onto the countertop.

Similarly, most laundry rooms have a washer and a dryer placed adjacent to one another which results in a gap between the washer and the dryer. With this gap, dust and small articles of clothing such as socks fall to the floor.

Thus, there exists a need in the art for a device that does not cover the gap but allows debris and small objects to fall directly into a plastic trap thereby resulting in a cleaner environment.

BRIEF SUMMARY OF THE INVENTION

Therefore, it is a primary object, feature, or advantage of the present invention to improve on or overcome the deficiencies in the art.

It is another object, feature, or advantage of the present invention to provide a device that is inserted in between the stove and countertop and is not visible on the smooth service of the countertop.

It is another object, feature, or advantage of the present invention to provide a device that is inserted in between the washer and dryer.

It is still yet a further object, feature, or advantage of the present invention to provide a device that is usable for a wide variety of applications. For example, the device may be used to prevent small items such as kitchen utensils or articles of clothing (e.g., socks) from falling between two objects or more than two objects.

It is still yet a further object, feature, or advantage of the present invention to provide a device that is safe to use in the kitchen and the laundry room. For example, the device may be free from sharp edges, made from a heat resistant or non-flammable material, and may be colored to contrast the two stationary objects which surround the device.

It is still yet a further object, feature, or advantage of the present invention to a device that is cost effective.

It is still yet a further object, feature, or advantage of the present invention to provide a device that is reliable and durable and has a long usable life.

It is still yet a further object, feature, or advantage of the present invention to provide a device that can be easily manufactured, installed, uninstalled, repaired, replaced, stored, transported, and cleaned.

It is still yet a further object, feature, or advantage of the present invention to provide a device that is aesthetically pleasing.

The following provides a list of aspects and/or embodiments disclosed herein and does not limit the overall disclosure. It is contemplated that any of the embodiments disclosed herein can be combined with other embodiments, either in full or partially, as would be understood from reading the disclosure.

According to some aspects of the disclosure, a device for preventing small items from falling between several objects includes a first surface and a second surface joined at a radial bend or crease. Additionally, the device is securable between the several objects at a distance below the upper surfaces of the several objects.

According to some additional aspects of the disclosure, the device may comprise a flexible material or a rigid material.

According to some additional aspects of the disclosure, the first surface and the second surface have inner edges which may be flat or rounded.

According to some additional aspects of the disclosure, the device comprises pellets.

According to some additional aspects of the disclosure, the device includes a lip or flange at the outer edge of the first surface or the second surface.

According to some other aspects of the disclosure, a system includes the device described above and at least two stationary objects, the device being secured between and at a distance below the upper surfaces of at least two stationary objects.

According to some additional aspects of the disclosure, the device is secured between the at least two stationary objects via friction fit.

According to some additional aspects of the disclosure, the at least two stationary objects include a countertop and a stove.

According to some additional aspects of the disclosure, the at least two stationary objects include a washer and a dryer.

According to some additional aspects of the disclosure, the radial bend or crease comprises an acute angle, an orthogonal angle, or an obtuse angle.

According to some additional aspects of the disclosure, the device includes a base that extends downward towards the floor.

According to some other aspects of the disclosure, a method of using the device described above to prevent small items from falling between several objects includes inserting and suspending the device within a gap between a countertop and a stove or between a washer and a dryer.

According to some additional aspects of the disclosure, the method further includes removing the device, cleaning the device, and reinserting the device into the gap between the countertop and the stove or between the washer and the dryer.

According to some other aspects of the disclosure, a method of manufacturing the device described above includes melting and extruding plastic to form the shape of the device.

According to some additional aspects of the disclosure, the method includes cutting the plastic to a length that spans the depth of the countertop and the stove or the depth of the washer and the dryer.

According to some additional aspects of the disclosure, the method includes pressing the plastic to form the radial bend or crease.

These or other objects, features, and advantages of the present invention will be apparent to those skilled in the art after reviewing the following detailed description of the illustrated embodiments, accompanied by the attached drawings.

BRIEF DESCRIPTION OF THE DRAWINGS

FIG. 4 shows the device of FIG. 1A between a countertop and a stove or oven according to some aspects of the present disclosure.

Figure 1A:
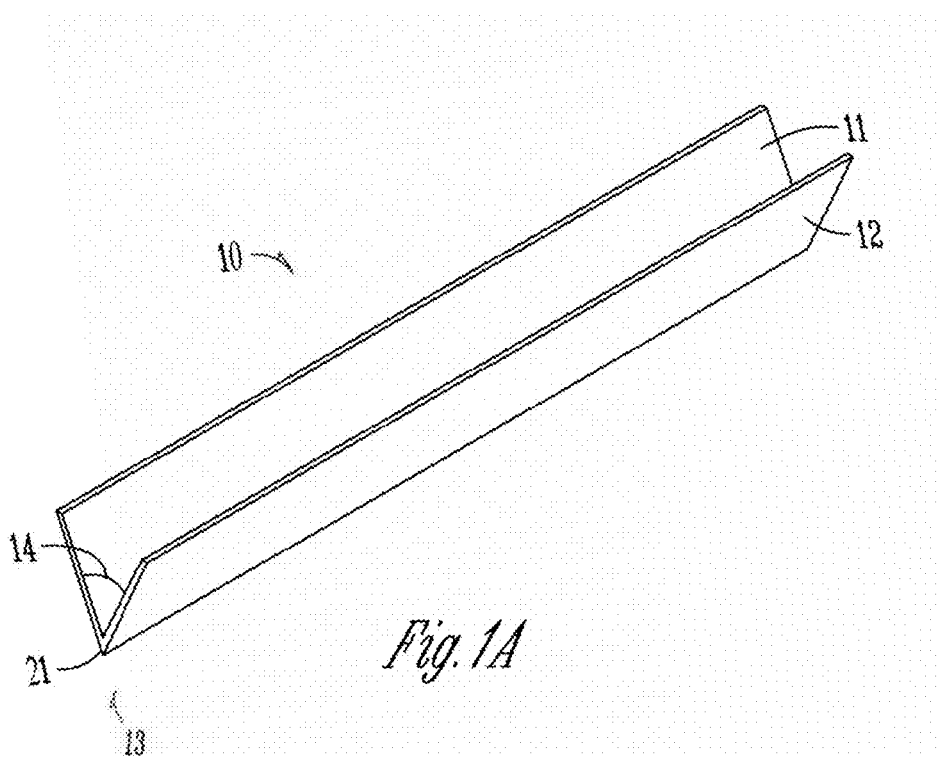
FIGS. 1A-B show prospective views of two exemplary devices for preventing small items from falling between several objects according to some aspects of the present disclosure.
Figure 1B:
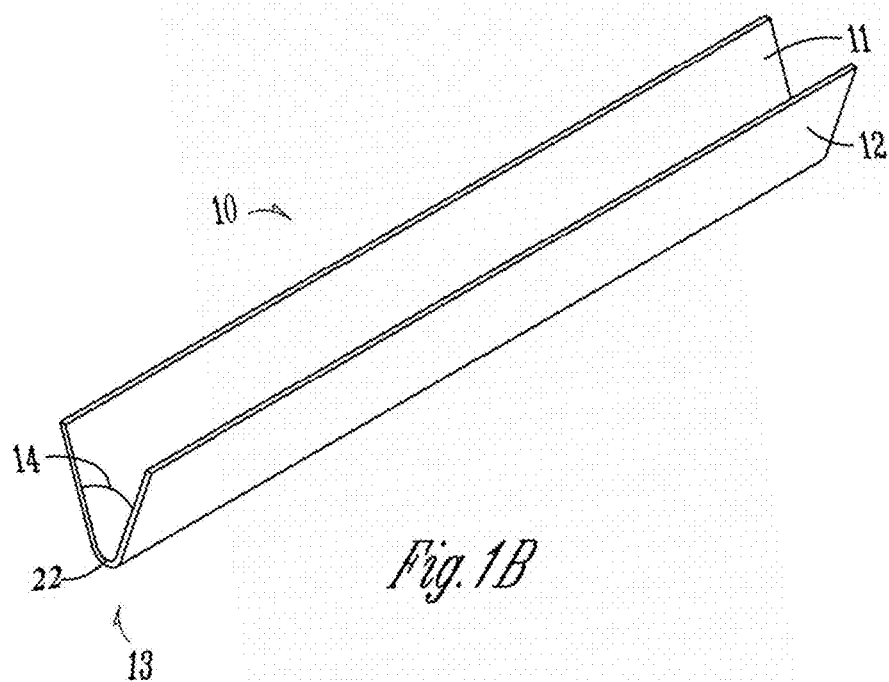

Various embodiments of the present disclosure illustrate specific embodiments in which the present invention may be practiced. These embodiments of the present invention will be described in detail with reference to the drawings, wherein like reference numerals represent like parts throughout the several views. Reference to various embodiments does not limit the scope of the present disclosure and the drawings represented herein are presented for exemplary purposes.

DETAILED DESCRIPTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

The terms "invention" or "present invention" as used herein are not intended to refer to any single embodiment of the particular invention but encompass all possible embodiments as described in the specification and the claims.

The term "about" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed or configured to perform a particular task or to adopt a particular configuration. The term "configured" can be used interchangeably with other similar phrases such as constructed, arranged, adapted, manufactured, and the like.

Terms such as first, second, vertical, horizontal, top, bottom, upper, lower, front, rear, end, sides, concave, convex, and the like, are referenced according to the views presented. These terms are used only for purposes of description and are not limiting. Orientation of an object or a combination of objects may change without departing from the scope of the invention.

The apparatuses, systems, and methods of the present invention may comprise, consist essentially of, or consist of the components of the present invention described herein. The term "consisting essentially of" means that the apparatuses, systems, and methods may include additional components or steps, but only if the additional components or steps do not materially alter the basic and novel characteristics of the claimed apparatuses, systems, and methods.

The following embodiments are described in sufficient detail to enable those skilled in the art to practice the invention however other embodiments may be utilized. Mechanical, procedural, and other changes may be made without departing from the spirit and scope of the invention. Accordingly, the scope of the invention is defined only by the appended claims, along with the full scope of equivalents to which such claims are entitled.

For the purposes of the present disclosure, the term "small items" includes food, food ingredients (e.g. flour), and food particulates such as crumbs; waste material; debris such as dust, dirt, or pollen; articles of clothing such as undergarments and socks; kitchen supplies such as silverware or cleaning supplies; laundry supplies such as detergent and fabric softeners, or any other small items which may be caught by the catching device disclosed herein that is commonly understood in the art.

As stated above, most kitchens have a free-standing stove/oven recessed between countertop space which results in a gap between the stove and the countertop. Most laundry rooms have a washer and a dryer which results in a gap between the washer and the dryer. With this gap, small items fall to the floor. Since the gap between the stove and countertop or between the washer and the dryer is small, one cannot easily clean the floor to remove the fallen debris, requiring the appliance to be moved for cleaning. This gap results in a messy, unclean floor in kitchens and laundry rooms causing much angst. The present disclosure solves this problem.

The catching device 10 shown in FIGS. 1-4 includes a first surface 11 and a second surface 12 joined at a radial bend or crease 13. The radial bend or crease 13 is bent or folded at an angle 14, the angle being an acute angle, an orthogonal angle, or an obtuse angle.

Figure 2:
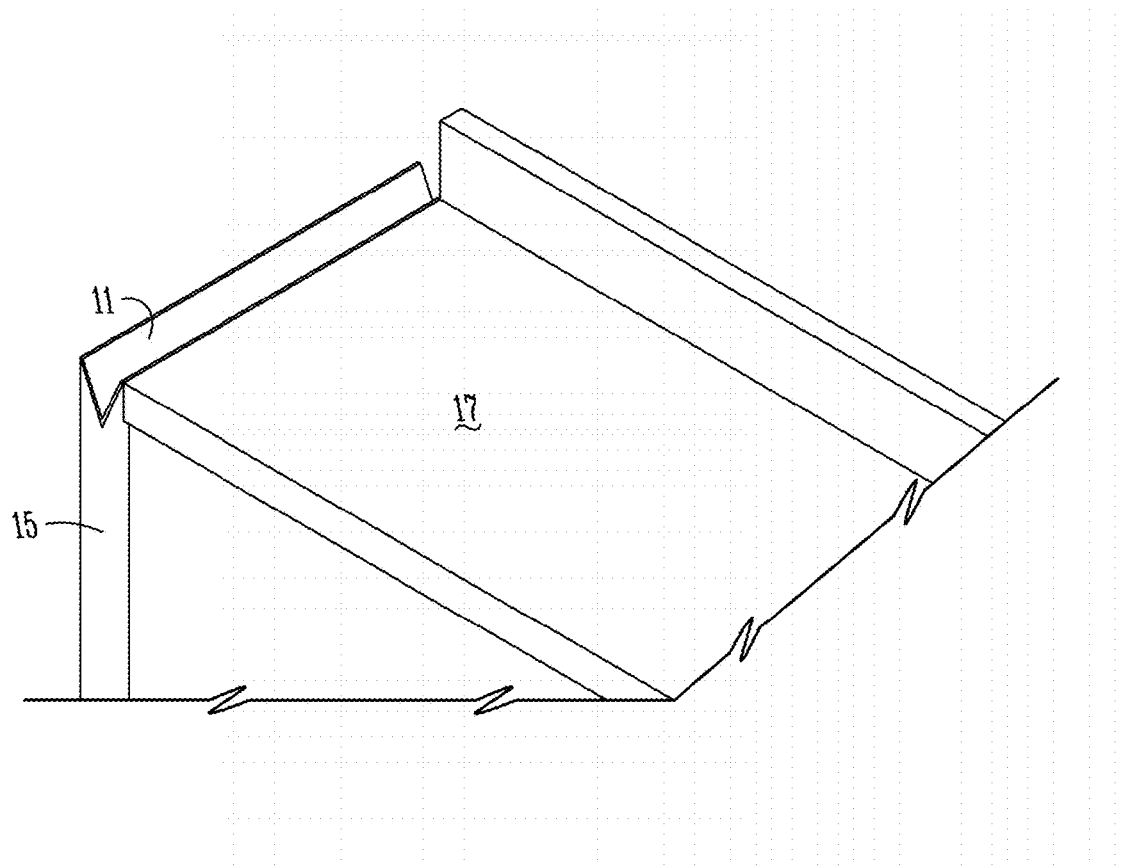
FIG. 2 shows the device of FIG. 1A adjacent to a first object, such as a countertop, according to some aspects of the present disclosure.
Figure 3:
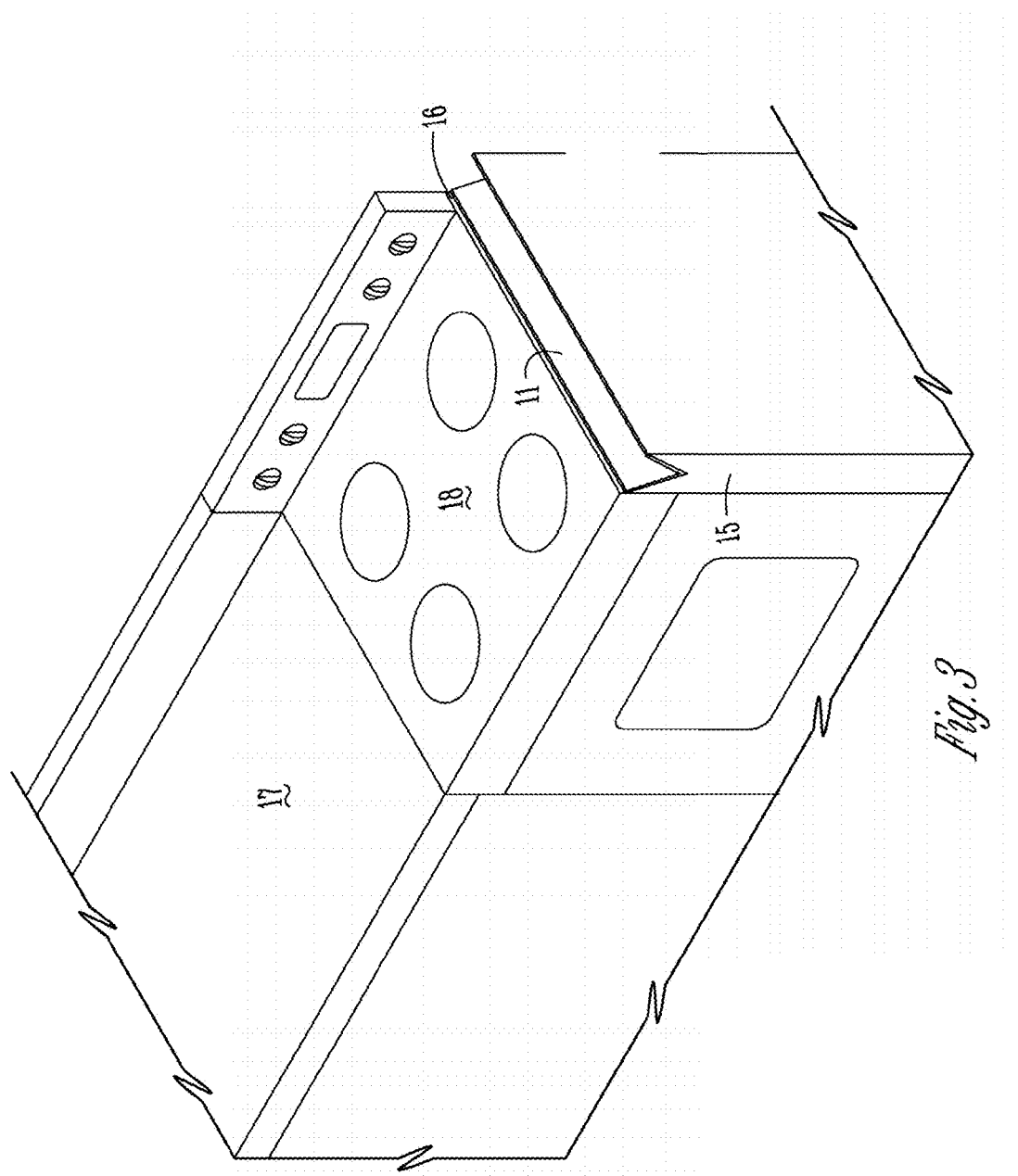
FIG. 3 shows the device of FIG. 1A adjacent to a first object, such as a stove or oven, according to some aspects of the present disclosure.

The catching device 10 is typically meant to be secured between several objects at a distance below the upper surfaces of the several objects. The first and second surfaces 11, 12 may have inner edges which may be flat or rounded and/or may have outer edges which may include a lip or flange at the outer edge of the first surface or the second surface to help provide more friction between the catching device 10 and the objects in which the catching device 10 is secured between. The objects in which the catching device 10 are secured between are preferably stationary. Additionally, as is shown in FIGS. 2-4, the catching device 10 may include a base 15 or even a flange or lip 16 to improve the friction fit of the catching device 10. The base 15 may be weighted and typically extends down towards the floor.

The device is placed in between the countertop (2) and stove (3) to form a continuous angle or curve (4). This device fills the gap between the countertop (2) and stove (3) to catch all material and debris and prevent them from falling onto the floor between the stove and countertop.

According to a preferred embodiment, the catching device 10 may be manufactured or formed through the use of a specific tool that melts plastic and extrudes the plastic before allowing the melted plastic to cure. Alternatively, a flat finished material (e.g. a sheet or roll of plastic) may be cut to the proper length and pressed into a bend to create the shape of the catching device 10. Any pliable or formable material may be used to form the catching device 10: including flexible materials, rigid materials, and pellets.

In operation, the the catching device 10 is inserted between the side of cabinetry or a countertop 17 and an oven or stove 18 whereby the entire gap 19 between the countertop 17 and stove 18 is filled, leaving no space. A user may optionally cut the catching device 10 prior to operation to a desired length, which may correspond with the depth of the user's stove 18 and the width of the gap 19 and then the user may insert the catching device 10 by pinching the first and second surfaces 11, 12 together and pushing the catching device 10 in the gap 19 between the stove 18 and countertop 17. The catching device 10 will self-suspend in the gap 19 by force of the plastic resisting against the side wall (i.e. a friction fit) of the countertop 17 and stove 18, creating a seal to stop the debris falling to the floor. The catching device 10 should be pushed down far enough to be out of sight. In a preferred embodiment, this distance is about ¼ inches from the upper surfaces of the stove/countertop 17, 18.

The catching device 10 of FIGS. 1-4 may be composed of plastic and shaped in a continuous angular or rounded manner and is typically placed by the end user between a stove 18 and countertop 17. Once inserted, the device uses the resistance of a friction fit to hold itself in place, thus creating a channel catching all falling debris and crumbs. The catching device 10 prevents any unwanted material from falling onto the floor. The device can be removed, cleaned, and reinserted into the gap for continued use thus eliminating issues associated with accumulating a mess on the floor between the stove and countertop.

The catching device 10 differs from what is known in the art and is advantageous because the catching device 10 may be inserted directly into the gap 19 between the stove 18 and countertop 17 thereby preventing debris from falling onto the floor without changing the aesthetics of a kitchen. Additionally, the catching device 10 allows debris to fall before being caught, eliminating debris build-up on the countertop 17.

Devices known in the art, such as the stove gap filler, do not work well because they create large bumps where debris and crumbs get stuck. These bumps, on top of being very ugly to look at, are unhealthy for the kitchen because they result in a mess and allow germs to accumulate on the object surfaces 17, 18 that should be clean and tidy for cooking.

The catching device 10 does not cover the gap 19 but is inserted into the gap 19, which results in a cleaner, aesthetically appealing countertop. This is because debris falls downward and can no longer be seen on the countertop, as the catching device 10 is located at a distance below the surfaces of the upper object surfaces 17, 18 and is colored such that the catching device is not easily visible.

While the catching device 10 shown in the figures is placed between a countertop 17 and a stove 18, such a representation is made only by way of example and to enable the present invention. It is to be understood these appliances may be substituted by any common and suitable household appliances, including washers, dryer, trash receptacles, recycling receptacles, dishwashers, refrigerators, freezers. Furthermore, the catching device need not even be inserted between two household appliances. For example, the catching device 10 could be inserted between furniture within a house, between a car seat and the center console of a car, between a desk at a school or an office and a wall, etc.

From the foregoing, it can be seen that the present invention accomplishes at least all of the stated objectives.

LIST OF REFERENCE NUMERALS

The following list of reference numerals is provided to facilitate an understanding and examination of the present disclosure and is not exhaustive. Provided it is possible to do so, elements identified by a numeral may be replaced or used in combination with any elements identified by a separate numeral. Additionally, numerals are not limited to the descriptors provided herein and include equivalent structures and other objects possessing the same function.

10 catching device
11 first surface
12 second surface
13 radial bend or crease
14 angle
15 base
16 flange or lip
17 cabinetry or countertop
18 stove
19 gap
20 system
21 flat edge
22 rounded edge The present disclosure is not to be limited to the particular embodiments described herein. The following claims set forth a number of the embodiments of the present disclosure with greater particularity.

What is claimed is:

1. A device for preventing small items from falling between several objects, comprising:
   a first surface and a second surface joined at a radial bend or crease;
   wherein the device comprises a rigid material; and
   wherein the device is securable between the several objects at a distance below the upper surfaces of the several objects without changing the aesthetics of the several objects.

2. The device of claim 1 wherein the edges of the first surface and the second surface are flat.

3. The device of claim 1 wherein at least one edge of the first surface and the second surface is rounded.

4. The device of claim 1 further comprising a lip or flange at the outer edge of the first surface or the second surface.

5. The device of claim 1 further comprising includes a base.

6. A system comprising the device of claim 1 and at least two stationary objects, the device being secured between and at a distance below the upper surfaces of the at least two stationary objects via friction fit.

7. The system of claim 6 wherein the at least two stationary objects include a countertop and a stove.

8. The system of claim 6 wherein the at least two stationary objects include a washer and a dryer.

9. The system of claim 6 wherein the radial bend or crease comprises an acute angle.

10. The system of claim 6 wherein the radial bend or crease comprises an orthogonal angle.

11. The system of claim 6 wherein the radial bend or crease comprises an obtuse angle.

12. The system of claim 6 wherein the device includes a base that extends downward towards the floor.

13. A method of using the device of claim 1 to prevent small items from falling between several objects, comprising:
   inserting and suspending the device within a gap between a countertop and a stove or between a washer and a dryer.

14. The method of claim 13 further comprising:
   removing the device;
   cleaning the device; and
   reinserting the device into the gap between the countertop and the stove or between the washer and the dryer.

15. A method of manufacturing the device of claim 1 comprising melting and extruding plastic to form the shape of the device.

16. The method of claim 15 further comprising cutting the plastic to a length that spans the depth of the countertop and the stove or the depth of the washer and the dryer.

17. The method of claim 15 further comprising pressing the plastic to form the radial bend or crease.

* * * * *